United States Patent [19]

Cohen

[11] 4,340,283
[45] * Jul. 20, 1982

[54] PHASE SHIFT MULTIFOCAL ZONE PLATE

[76] Inventor: Allen L. Cohen, 10108 Windsong Ter., Richmond, Va. 23233

[ * ] Notice: The portion of the term of this patent subsequent to Jul. 1, 1997, has been disclaimed.

[21] Appl. No.: 98,771

[22] Filed: Dec. 17, 1979

Related U.S. Application Data

[63] Continuation-in-part of Ser. No. 970,751, Dec. 18, 1978, Pat. No. 4,210,391.

[51] Int. Cl.³ .......................... G02B 3/08; G02B 5/18; G02C 7/04
[52] U.S. Cl. .............................. 351/161; 350/162 ZP; 350/452; 351/168
[58] Field of Search ............... 351/160 R, 160 H, 161, 351/168; 350/162 ZP, 452

[56] References Cited

U.S. PATENT DOCUMENTS 3,004,470 10/1961 Rühle ................................. 350/452

OTHER PUBLICATIONS

Ziegler, J. F., "Fabrication or Correction of Optical Lenses", *IBM Tech. Dis. Bulletin,* vol. 12, No. 10, Mar. 1970, pp. 1573-1575.

Primary Examiner—John K. Corbin
Assistant Examiner—Scott J. Sugarman

[57] ABSTRACT

A multifocal zone plate construction suitable for use in optical systems with multifocal requirements. It is designed as a phase shift multifocal zone plate to provide multiple focii with bright images. This is accomplished by adjusting the zone plate spacings such that some of the zone plate focii actually coincide with some of the multifocal Fresnel lens focii.

9 Claims, 11 Drawing Figures $r_n = \sqrt{nd\lambda}$ $d = 1/(F_e - F_0)$

PHASE SHIFT MULTIFOCAL ZONE PLATE

CROSS REFERENCE TO RELATED APPLICATION

This application is a continuation-in-part of application Ser. No. 970,751 filed Dec. 18, 1978, now U.S. Pat. No. 4,210,391.

BACKGROUND OF THE INVENTION

This invention relates to multifocal optical devices which have their multifocal property distributed approximately throughout said devices, and more particularly to multifocal zone plates as described in my patent application Ser. No. 970,571.

A multifocal Fresnel lens has been previously described as a lens consisting of a plurality of annular rings, the surfaces of which are made part of a carrier lens, and have the same inclinations to the optical axis, in a repetitive interleaving pattern, as the individual surfaces of the separate single focal power lenses that they wish to combine.

The concept of a multifocal zone plate was developed as an improvement on the multifocal Fresnel lens, wherein the geometrical spacings of the annular rings of said multifocal Fresnel lens, were set to obey the usual spacing of a zone plate diffraction grating.

Multifocal zone plate mirrors as well as lenses have been described.

However, one can make an improvement in these designs as relates to the level of light intensity available at each of the focal points. Multifocal Fresnel lenses and multifocal zone plates can be designed in such a manner as to cause the intensity of light coming to focus at each focal point, to approach the intensity of light available at the focus of an ordinary monofocal lens.

In order to understand the nature of the problem, we should make note first, that in an ordinary monofocal lens all of the incident light comes to focus in phase at the single focal point. However, in an annular zone multifocal Fresnel lens with two focal points, the incident light is shared between the two focal points. For example, we may have half of the incident light brought to focus in phase at one focal point, and half the incident light brought to focus in phase at the other focal point. However, since brightness is proportional to the square of the convergent in phase light, the intensity of the focussed light at each of the two focii, is only 25% of the usual intensity of light focussed by an ordinary monofocal lens.

The situation is even more dramatic in the case of a zone plate. In this case, the incident light is again reduced at each of the two primary focii. However, the light arriving at each focal point is not in perfect phase and achieves an amplitude of only $1/\pi$th of that at the focal point of an ordinary monofocal lens. Again, since brightness is proportional to the square of the amplitude, the intensity of focussed light at each of the two primary focii of a zone plate is approximately 10% of the usual intensity of focussed light in a monofocal lens.

Finally in the case of a multifocal zone plate, we have a number of different focii, some of them with a 25% image brightness and some of them with a 10% image brightness. However, by judiciously arranging the design of a multifocal zone plate, we can cause some of the zone plate focii to coincide with some of the multifocal Fresnel lens focii. At these double focii we will have an amplitude of light equal to 0.818 (i.e. $\frac{1}{2}+1/\pi$) of that at the focal point of an ordinary monofocal lens. And since brightness is proportional to the square of amplitude, the intensity of focussed light at each of the double focii is approximately 67% of the usual intensity of focussed light in a monofocal lens. FIG. 1 shows the annular zone spacing of such a lens.

SUMMARY OF THE INVENTION

The purpose of a multifocal lens, is to increase the number of foci to which incident light will converge. Unfortunately, whenever this has been done, it has been at the expense of the image brightness at each of the foci.

The present invention makes use of the fact that multifocal zone plates have many subsidiary zone plate foci in addition to the multiple Fresnel lens foci. By properly adjusting the annular zone spacings in a multifocal zone plate, we can shift some of the zone plate foci until they coincide with some of the Fresnel lens foci. In this case there will be a significant increase in intensity of light at these double foci.

The present invention is summarized in a multiple power optical device having a plurality of alternating odd and even, annular, concentric zones, bounded on the outside by radii $r_n$, with $n = 1, 3, 5, \ldots$, for the odd zones and $n = 2, 4, 6, \ldots$, for the even zones; first focal power means within at least some of the odd zones for directing incident parallel light to a first focal point; second focal power means within at least some of the even zones for directing incident parallel light to a second focal point different from said first focal point; wherein the radii $r_n$ of said odd and even zones are substantially proportional to the square root of n; and wherein the absolute value of $r_1$ is set equal to $\sqrt{\lambda d}$, with $\lambda$ equal to the wavelength under consideration, and d is substantially equal to the reciprocal of the absolute value of the difference between the first and second focal powers.

An important advantage of this invention, is that its performance as a multifocal optical element is not limited by dim focal images inherrent in the usual multifocal lens designs.

Other objects and advantages of the present invention will be more fully apparent from the following description of the preferred embodiments when taken in conjunction with the accompanying drawings.

DESCRIPTION OF THE PREFERRED EMBODIMENTS

Figure 1:
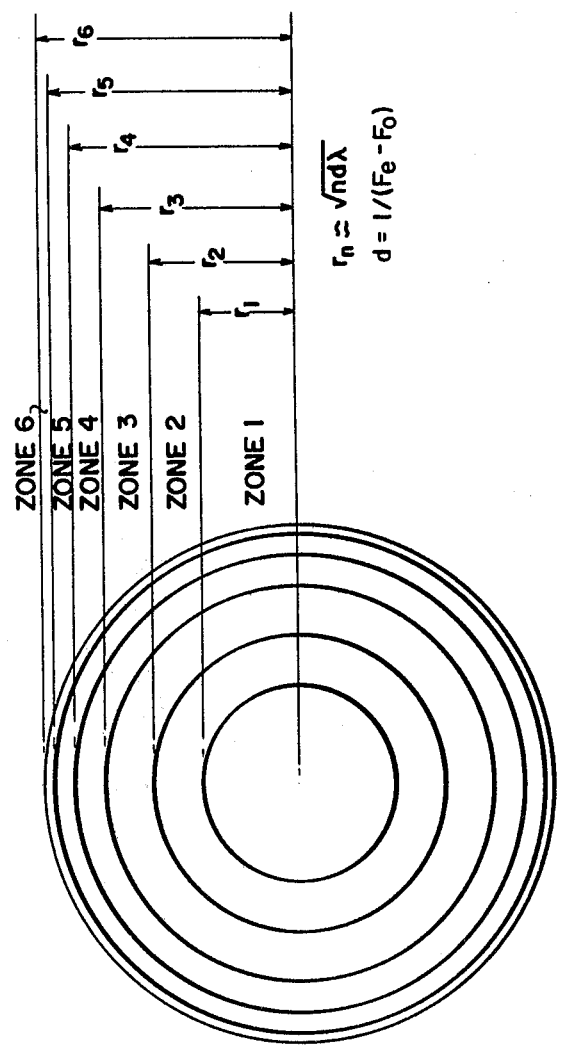
FIG. 1 shows a pattern of concentric circles demarcating the half wave zones of a phase shift multifocal zone plate.
Figure 2:
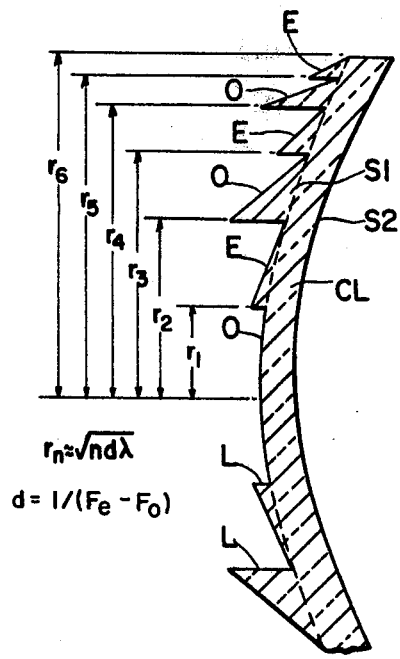
FIG. 2 shows a cross-sectional view of a phase shift bifocal zone plate spectacle lens in accordance with the present invention.

In the embodiment of the invention as shown in FIG. 2, we have by way of illustration, the anterior surface S1 of a carrier lens or body CL divided into six concentric zones, bounded by radii $r_1$-$r_6$, in such a manner as to form a phase shift "bifocal" zone plate. The carrier lens or body of course, is constructed according to the usual principles governing the design of an optical lens with the surfaces S1 and S2 either spherical, sphero-cylindrical, or of any other appropriate lens design. The spherical, sphero-cylindrical, or aspherical power F of the carrier lens depends, according to the standard lens formulas, on the curvatures of the anterior and posterior surfaces S1 and S2 respectively, the center thickness CT, and the refractive index of the carrier lens. These parameters are in turn, determined by the intended use of the multifocal zone plate and the materials available. For example, the posterior surface S2 may be shaped so as to minimize off axis optical aberrations if the multifocal zone plate is to be used as a spectacle lens. Standard optical materials such as glass, plastic, etc., or any other optically refracting materials may be used in the fabrication of this and all subsequent embodiments.

In this present configuration, a zone is determined as odd if it is bounded on the outside by a radius $r_n$ with n being an odd integer, and even if n is an even integer. The optical facets of the odd zones are labeled O and correspond in inclination to one particular focal power $F_o$, while the optical facets of the even zones are labeled E and correspond to a specific but different focal power $F_e$. While $F_o$ and $F_e$ may be determined arbitrarily, once they are fixed, the inclinations of the facets must be constructed according to the principles of Fresnel zones as discussed by H. Ruhle in his U.S. Pat. No. 3,004,470. The adjacent facets are separated by non-refractive ledges L.

The spacing of the annular zones is of course given by the zone plate formula for $r_n$. In particular, the radii $r_n$, demarcating the boundaries between the annular zones are determined by $r_n = \sqrt{nd\lambda}$, where $n = 1,2,3, \ldots$, $\lambda$ is equal to the wavelength of light under consideration, and d is the zone plate focal length.

The new and important feature of this embodiment, and of all the subsequent embodiments, is the choice of a value for d. In my invention the optimal image brightness occurs when d is set substantially equal to the absolute value of the reciprocal of the difference between two of the Fresnel zone optical powers. Naturally, we still have some light enhancement whenever d is different from, but still reasonably close to this optimal value. In this embodiment we have a phase shift bifocal zone plate spectacle lens with the two focal powers 0.5D and 2.0D. Furthermore, since we are dealing with a spectacle lens in this embodiment, we have chosen $\lambda$, the wavelength under consideration, to be equal to 555 nm. This is of course close to the wavelength to which the human eye will accommodate under normal viewing situations. The wavelength under consideration will be different for other uses of my invention. To complete the specifications of this embodiment, we have $F_o = 0.5D$, and $F_e = 2.0D$, and $1/d = F_e - F_o = 1.5D$. In this case, the additional zone plate focal powers would be $F_o - 1/d = -1.0D$, $F_e - 1/d = 0.5D$, $F_o + 1/d = 2.0D$, and $F_e + 1/d = 3.5D$. Thus we see that the two zone plate foci $F_e - 1/d = 0.5D$ and $F_o + 1/d = 2.0D$ coincide with the Fresnel lens focal powers $F_o = 0.5D$ and $F_e = 2.0D$. The net result is that at these two focal points the brightness of the focal images will be approximately 67% that of the incident light.

Figure 3:
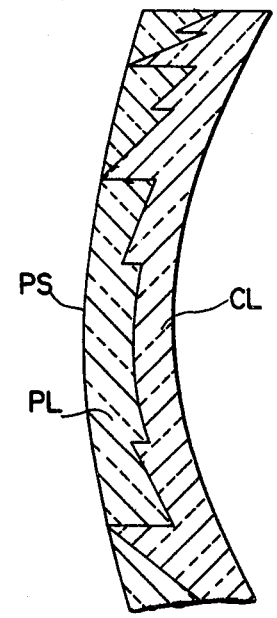
FIG. 3 shows a cross-sectional view of a portion of a phase shift bifocal zone plate in accordance with one modification of the present invention.
Figure 4:
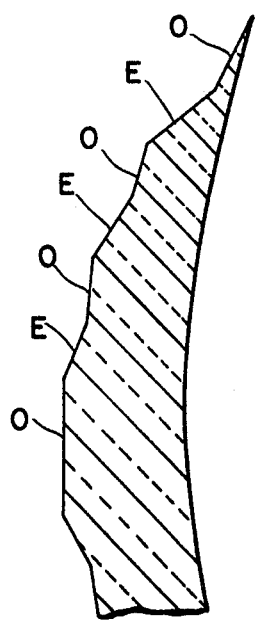
FIG. 4 shows a cross-sectional view of a portion of a phase shift bifocal zone plate formed without any ledges in accordance with another modification of the present invention.
Figure 5:
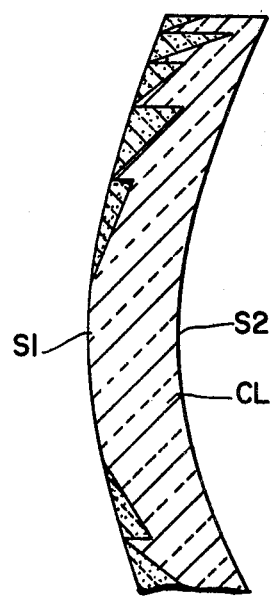
FIG. 5 shows a cross-sectional view of a portion of a phase shift bifocal zone plate formed by ion implementation in accordance with still another modification of the present invention.

When we wish to avoid a saw-toothed surface as in the case of a contact lens, or to protect the facets from dirt or damage, we may consider a number of possible modifications as shown in FIGS. 3-5. In FIG. 3, we see one possible modification, as suggested by Hofmann and Weinhold in their Brit. Pat. No. 1,154,360, wherein the multifocal zone plate has its saw-toothed surface imbedded in an optical media PL, which has an index of refraction differing from that of the carrier lens CL, and which can be shaped and polished to a smooth front surface of any desired power. Once again, what is new and novel in this embodiment is the spacing of the annular Fresnel zones. We must still choose the value of d to be substantially equal to the reciprocal of the difference between two Fresnel zone optical powers. In this case $d = 1/(F_e - F_o)$. Here, and in all subsequent embodiments, d is always taken to be greater than zero.

And still another possible modification is shown in FIG. 4, where the optical facets of the odd and even zones are interfaced without any non-refractive ledges or steps occuring between adjacent facets. In this case the inclinations of the odd and even facets, designated O and E, respectively are determined in exactly the same manner as in the embodiment of FIG. 2, but the facets are displaced parallel to the optical axis of the lens, such that the bounding edges of adjacent facets coincide, thereby eliminating all of the non-refractive ledges which would normally occur at the boundaries between adjacent Fresnel zones.

Figure 6:
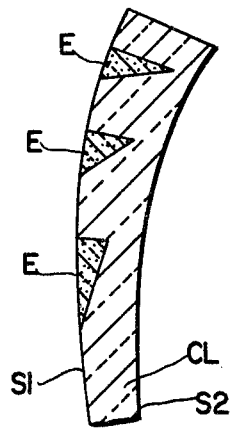
FIG. 6 shows a cross-sectional view of a portion of a phase shift bifocal zone plate formed by ion implantation into the even zones only in accordance with even another modification of the present invention.
Figure 7:
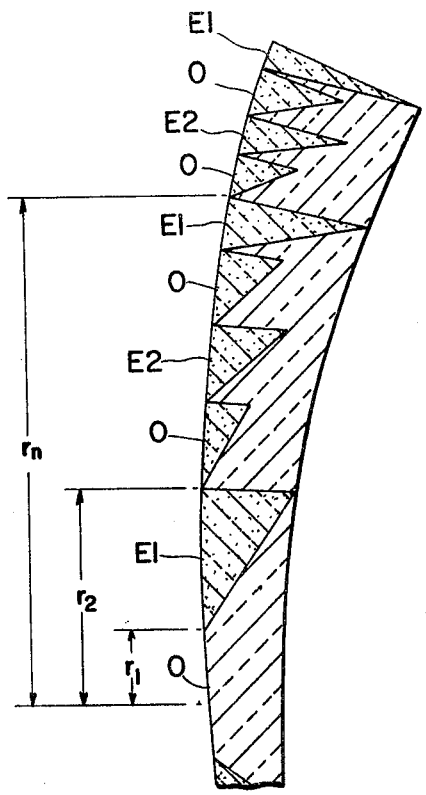
FIG. 7 shows a cross-sectional view of a portion of a phase shift trifocal zone plate formed by ion implantation into a carrier lens in accordance with the present invention.

A fabrication method which avoids a saw-toothed surface, is that of ion implementation into a smooth surfaced carrier lens. This procedure is discussed by J. F. Ziegler in his article "Fabrication or Correction of Optical Lenses", IBM Technical Disclosure Bulletin, Vol. 12, No. 10, March 1970, pp. 1573-1575. The Fresnel zones are actually formed by the imbedding of contaminants into the carrier lens or body CL which thereby alters its refractive index. Of course the formation of different zones may require different contaminants. In FIG. 5, we see the cross-section of a phase shift bifocal zone plate formed by such a process. As usual, the surfaces S1 and S2 determine the carrier lens or body CL of FIG. 5. The illustrated saw-toothed areas, shown filled in with dots, serve as representations of zones formed by ion implantation. In FIG. 6, we also see a phase shift bifocal zone plate which utilizes the ion implantation method of construction. However, in this case, the carrier lens CL is fabricated to have the power $F_o$ by proper design of its surfaces S1 and S2. Now since $F_o$ is the required power for the odd Fresnel zones, in this situation, we only need to implant ions to form the even zones, so as to modify the carrier lens power from $F_o$ to $F_e$ for these even zones. This leads to a simpler construction than that of FIG. 5. Naturally we are not limited to bifocals, but can also consider trifocals, quadrafocals, etc. For example, in FIG. 7 we see an ion implanted phase shift "trifocal" zone plate. One primary focal power $F_o$, is confined to the odd zones labeled O, while the other two primary powers $F_{e1}$ and $F_{e2}$, are distributed alternately throughout the even zones which are labeled E1 and E2. Again, the zones must be formed by bounding radii $r_n$, where $r_n = \sqrt{nd\lambda}$. In this case it is most advantageous to set the powers $F_o$, $F_{e1}$, and $F_{e2}$ such that we have $F_{e2} - F_o = F_o - F_{e1}$. Then we can set $d = F_{e2} - F_o = F_o - F_{e1}$. This creates double focii at all three focal powers $F_o$, $F_{e1}$, and $F_{e2}$.

Figure 8:
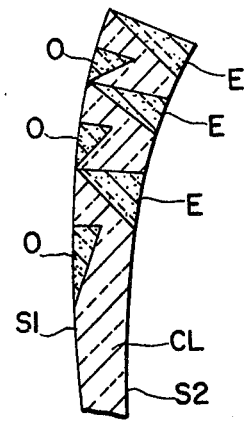
FIGS. 8 and 9 show cross-sectional views of portions of phase shift bifocal zone plates utilizing both surfaces of the carrier lens for ion implantation in accordance with modifications of the present invention.
Figure 9:
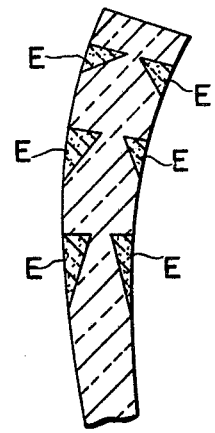

Another embodiment of the present invention, which utilizes ion implantation, is shown in FIG. 8, where the Fresnel zones are formed by ions implanted alternately into the opposite surfaces of the carrier lens, so as to create the odd zones beneath the anterior lens surface S1, and the even zones beneath the posterior lens surface S2. And an interesting variant of this idea combines features of the embodiments of FIGS. 6 and 8, to yield the embodiment of FIG. 9. In this embodiment, we let the carrier lens have the odd zone power $F_o$, as in the embodiment FIG. 6, but make use of both of the lens' surfaces, as in the embodiment of FIG. 8, to form the even zones by ion implantation. This design is useful in those cases where the depth of ion implantation would be a limiting factor in altering the power of the Fresnel zones, by allowing for double the power change achieveable by using one surface alone. It is clear that many other variations can be achieved by combining different features of the embodiments of FIGS. 5,6,7, and 8, to produce a multitude of different multifocal zone plate configurations.

Figure 10:
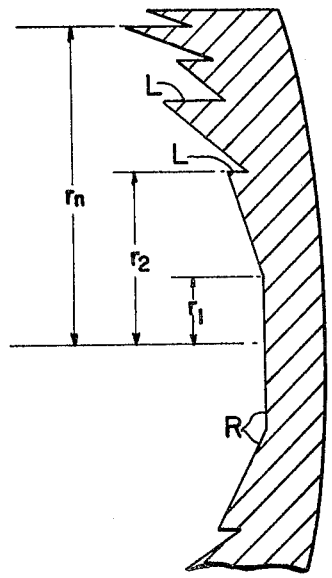
FIG. 10 is a cross-section of a portion of a phase shift multifocal zone plate mirror in accordance with the present invention.
Figure 11:
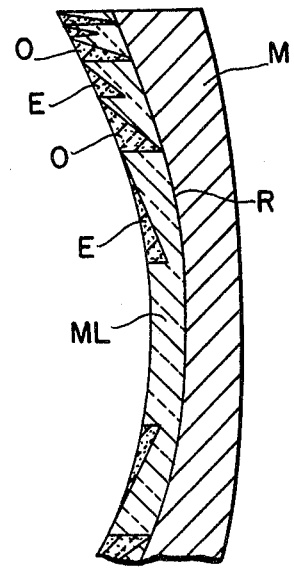
FIG. 11 is a cross-sectional view of a portion of a phase shift multifocal zone plate lens-mirror, with the lens formed by ion implantation in accordance with the present invention.

Two additional embodiments of the present invention are mirror body constructions. FIG. 10 shows a phase shift multifocal Fresnel zone plate mirror with zone plate spacings. The mirror body is made with a reflecting surface R, and has facets alternating in power between the odd and even zones. Features of the design of the embodiment shown in FIG. 4, can be used to modify the phase shift multifocal Fresnel zone mirror of FIG. 10, so as to eliminate all of the non-reflective ledges L on the surface. In FIG. 11 we see a compound lens-mirror system. The mirror M has a reflective surface R, and onto this surface an optically refractive material is deposited to form a lens ML. The Fresnel zones O and E, are then formed in the lens by ion implantation. Again all of the design features illustrated in FIGS. 3-8 are directly applicable, and will produce different and useful embodiments of a phase shift multifocal zone plate lens-mirror.

It should be understood, of course, that the foregoing disclosure relates only to the preferred embodiments of the invention, and that numerous modifications or alterations may be made therein, without departing from the spirit and scope of the invention as set forth in the appended claims.

What is claimed is new and desired to be protected by Letters Patent is:

1. A multiple focal power optical device comprising:
    body means having a plurality of alternating odd and even, annular, concentric zones, bounded on the outside by radii $r_n$, with $n = 1,3,5,\ldots$, for the odd zones and $n = 2,4,6,\ldots$, for the even zones;
    first focal power means within at least some of the odd zones for directing incident parallel light to a first focal point;
    second focal power means within at least some of the even zones for directing incident parallel light to a second focal point different from said first focal point;
    wherein the radii $r_n$ of said odd and even zones are substantially proportional to the square root of n;
    and wherein the absolute value of $r_1$ is set equal to $\sqrt{\lambda d}$, with $\lambda$ equal to the wavelength under consideration, and d is substantially equal to the reciprocal of the absolute value of the difference between the first and second focal powers.

2. The invention of claim 1 wherein said body means comprises an optically refracting material.

3. The invention of claim 2 wherein said first and second focal power means comprise a plurality of discreet refracting elements within their respective annular zones.

4. The invention of claim 3 wherein at least some of said optically refracting elements include contaminants imbedded in said body means to achieve the desired focal powers.

5. The invention of claim 4 wherein the discreet refractive elements of the first focal power means occupy every odd zone, and the discreet refractive elements of the second focal power means occupy every even zone.

6. The invention of claim 1 further including a third focal power means within at least some of the annular zones.

7. The invention of claim 1 wherein the body means is designed to act as an ophthalmic bifocal spectacle lens.

8. The invention of claim 1 wherein the body means is designed to act as an ophthalmic bifocal contact lens.

9. The invention of claim 1 wherein the said body means comprises an optically reflecting material.

* * * * *